(No Model.)
J. GOODNOUGH.
CULTIVATOR SPRING.
No. 316,140. Patented Apr. 21, 1885.
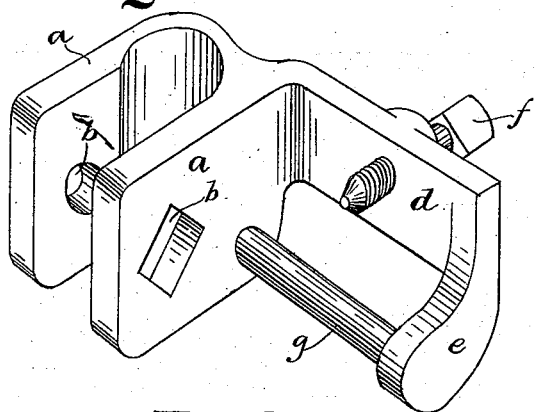
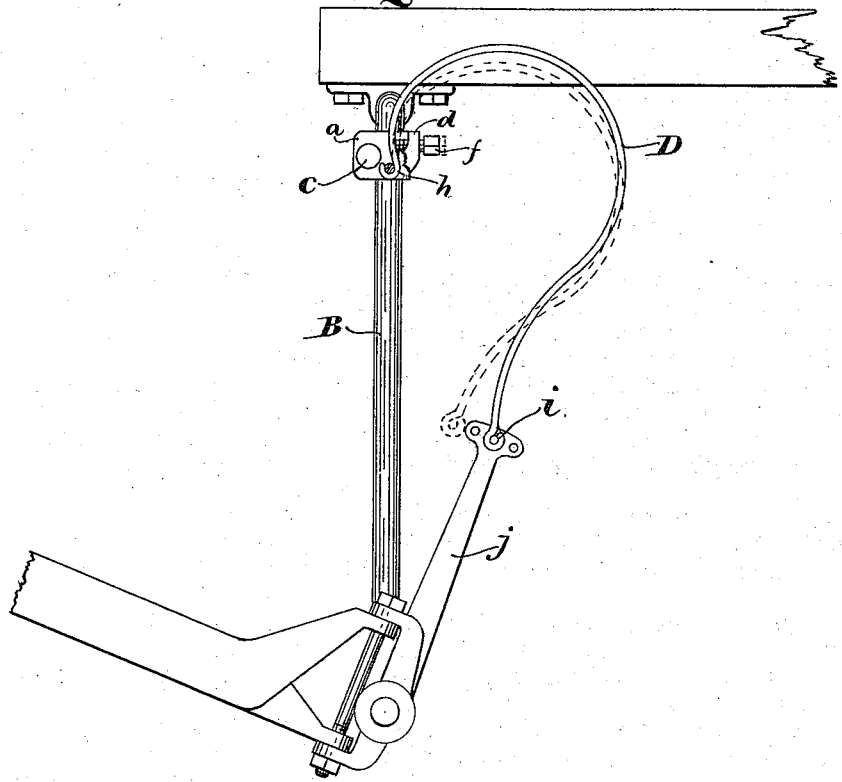
Witnesses.
Chas. N. Leonard.
H. P. Hood.
Inventor.
John Goodnough

UNITED STATES PATENT OFFICE.

JOHN GOODNOUGH, OF INDIANAPOLIS, INDIANA.

CULTIVATOR-SPRING.

SPECIFICATION forming part of Letters Patent No. 316,140, dated April 21, 1885.

Application filed December 3, 1884. (No model.)

*To all whom it may concern:*

Be it known that I, JOHN GOODNOUGH, a subject of Great Britain, who have declared under oath my intention to become a citizen of the United States, residing at Indianapolis, in the county of Marion and State of Indiana, have invented a new and useful Improvement in Attaching Cultivator-Springs, of which the following is a specification.

My invention relates to an improved means for attaching to the arch in a straddle-row cultivator the springs which lift the plow-beams. The general form of said springs and the manner of their operation form the subject-matter of another application for a patent.

The object of my present improvement is to adjustably secure the fixed ends of the lifting-springs to the arch, so that the angle at which the spring stands when not in tension may be readily changed, thereby increasing or diminishing the tension of the spring when the plows are in working position.

The accompanying drawings illustrate my invention.

Figure 1 is a perspective view of the clip for securing the spring to the arch. Fig. 2 is a side elevation showing the spring in position.

$a$ is a clip adapted to embrace B, one of the vertical sides of the arch of a cultivator, and to be clamped thereto by a bolt, $c$, passed through the holes $b\,b$.

$d$ is an arm projecting from clip $a$ at right angles thereto, and having at its outer end a short arm, $e$, parallel with clip $a$. A set-screw, $f$, passes through arm $d$, near its upper edge, midway between clip $a$ and arm $e$.

$g$ is a bar projecting from the side of clip $a$, near its lower edge, parallel to arm $d$, but below and back of said arm.

D is the spring, on the upper end of which is formed a hook, $h$, adapted to loosely and partially embrace bar $g$. The lower end of spring D has an eye, $i$, by which it is connected with an arm, $j$, projecting from the plow-beam coupling, as fully explained in my before-mentioned application, now pending.

The operation of my device is as follows: The upper end of the spring is placed between the clip $a$ and arm $e$, hook $h$, passing under and partly around bar $g$, being free to turn thereon. The back of the spring rests against the end of set-screw $f$. By turning said set-screw the relative angle which the spring forms with the arch may be changed, as indicated by the full and dotted lines. As the arm $j$ of the plow-coupling moves a certain fixed distance backward when the plow is lowered to bring the plows into working position, the tension of the spring will be greater or less as screw $e$ is turned in or out. The operator is thus enabled to nicely adjust the lifting-power of the spring to the requirements of different conditions of the soil or to different weights of plows used.

I claim as my invention—

1. The arch of a cultivator, the spring for lifting the plow-beam of said cultivator, the arm secured to said arch, the set-screw in said arm, and the bar to receive the hooked end of the spring, all combined substantially as shown and described, for the purpose specified.

2. The fastening for securing a spring to a cultivator-arch, consisting of the clip $a$, arms $d$ and $e$, set-screw $f$, and bar $g$, all combined substantially as specified.

JOHN GOODNOUGH.

Witnesses:
H. P. HOOD,
FRANK A. JACOB.